UNITED STATES PATENT OFFICE 2,678,924

TEXTILE PRINTING WITH ACRYLATE COPOLYMERS

Wilhelm Graulich, Wilhelm Becker, and Otto Bayer, Leverkusen-Bayerwerk, Germany, assignors to Farbenfabriken Bayer Aktiengesellschaft, Leverkusen, Germany, a corporation of Germany No Drawing. Application August 24, 1951, Serial No. 243,588

Claims priority, application Germany August 28, 1950

9 Claims. (Cl. 260—29.6)

The present invention relates to the printing of textiles and more particularly to a new and improved printing process and printing paste.

It is known in the printing of textiles according to the pigment printing process to employ polymer latices, which contain as binders polyvinyl compounds, such as polyvinyl acetate, methyl- or ethylmethacrylate or their copolymers with each other, or combinations of polyvinyl compounds with thermosetting resins.

Especially suitable for these purposes are the copolymer emulsions described in application Ser. No. 226,526, by Graulich et al. The prints obtained with these latices ordinarily satisfy all requirements, the fastness to rubbing and washing of prints obtained with these latices being of a special importance. Sometimes, however, the printing or padding of textiles from regenerated cellulose with these copolymer latices presents difficulties.

It is an object of this invention to avoid these difficulties and to provide a novel textile printing paste and a process for its application, with which the printing or padding of textiles from regenerated cellulose as well as other textiles and even paper may be carried out with improved results.

Further objects will become apparent as the following specification proceeds.

We have found, that polymers which contain no reactive groups may be reacted to yield crosslinked insoluble compounds with cross linking agents containing two or more reactive vinyl groups. According to the invention such polymers may be reacted as enumerated above, for instance polymers of vinyl acetate, methyl- or ethylmethacrylate, butadiene or interpolymers thereof. Further polymers of vinyl pyrrolidone, vinylpyridine, vinylmethylether or their interpolymers, further the copolymers described in the above named copending application Ser. No. 226,526, which consist of vinylcopolymers comprising at least one vinyl monomer of the group of lower alkyl-methacrylates, vinylchloride and vinylidene-chloride and at least one other vinyl-monomer from the group consisting of butadiene, methylbutadiene, chlorobutadiene, acrylonitrile, ethylene glycol-diacrylate and trimethylolpropanedi- or triacrylate.

It is also possible to employ mixtures of these polymers without reactive groups with other polymers containing reactive groups such as f. i. polymer latices from activated vinyl compounds in combination with polymers of acrylamide, acrylic acid, and the saponification products of polyvinylacetate. Instead of the mixtures, interpolymers of the above named compounds may be employed.

Compounds which contain two or more reactive vinyl groups and which are capable of rendering the above polymers or copolymers insoluble are f. i. the condensation product of formaldehyde and acrylonitrile (hexahydro-1.3.5-triacrylyl-s-triazine, described by Ballauf and Wegler, Chemische Berichte 81 (1948), page 527 seq.), further acrylic acid amides of polyamines like ethylene diamine etc. or acrylates of polyalcohols like ethyleneglycol, glycerol etc. or polyesters from polyfunctional unsaturated acids like maleic acid and polyvalent alcohols.

It could not be predicted that compounds having no reactive groups could react at all with these cross-linking agents. The application of the reaction for the printing and padding of textiles is variable. Thus it is of no importance, whether the textiles are pretreated with the compounds containing two or more reactive vinyl groups or whether these compounds are added to the printing paste containing the latex or whether the latices are reacted upon after printing or padding, during the drying operation. For the purposes of pigment printing all the known thickeners like tragacanth, alginates, or oil emulsions may be employed. The fixation of the prints is carried out at temperatures of about 80° C. to about 140° C.

The formulation of the printing pastes is carried out by intimately mixing the emulsions with the solution of the thickeners and then stirring the pigment dyestuff into the resulting paste. The paste can be diluted with water.

Apart from the possibility of employing a great number of polymers as starting materials the advantage of the process and printing paste of the invention resides in the simplicity and safety of its application since volatile, inflammable solvents are avoided. The main advantage of the novel printing paste, however, consists in the excellent properties of the prints obtained which are distinctly superior to the known printing processes as regards fastness to rubbing and washing. The color of the print is clear and the feel agreeable. This applies especially to the printing of textiles from regenerated cellulose, which hitherto presented great difficulties.

Instead of employing the printing paste and the printing process for the printing of textiles it may be also applied for the printing and padding of paper. This possibility is of importance especially in the production of wall paper since wall paper which is fast to rubbing and washing is obtained. In the following examples the parts are by weight.

*Example 1*

Five parts of the sodium salt of sulfonated long-chain paraffin-hydrocarbons are dissolved in 150 parts of water with the addition of 0.6 part of the sodium salt of the sulfinic acids of long-chain paraffins and two parts of normal sulfuric acid. In a closed vessel 30 parts of butadiene and 70 parts of methylmethacrylate are emulsified in this solution and polymerized at 30° C. After 42 hours a latex of a polymer content of 40% is obtained.

The adjustment of the printing paste is carried out by stirring 40 parts of this latex into a mixture of 15 parts alginate thickening (25:1000) and 12 parts of turpentine, which has previously been mixed with the acid dimethylamine salt of oleic acid as emulsifier. Into this paste 15 parts of Helio Fast Blue BL paste (20%) (Schultz Farbstofftabellen, volume I, 7th edition, No. 1188) are mixed and three parts of hexahydro-1.3.5-triacrylyl-s-triazine added. The mixture is then adjusted with water to 100 parts. Prints obtained with this pigment printing paste on rayon staple fabrics are dried and steamed. They are fast to rubbing and washing.

*Example 2*

30 parts of acrylonitrile, 30 parts of dichloroethene and 40 parts of butylacrylate are emulsified in a solution of 5 parts of the sodium salt of sulfonated long-chain paraffin hydrocarbons, 0.6 part of the sodium salt of sulfinic acids of long-chain paraffin hydrocarbons, 2 parts of normal sulfuric acid and 2 parts of acrylamide in 150 parts of water. After polymerizing for 24 hours at 15° C. a latex is obtained having a content of polymer of 38.5%.

45 parts of turpentine are mixed with 2 parts of benzyl-o-hydroxydiphenylpolygylcolether and 40 parts of the polymer emulsion described in the preceding paragraph. A printing paste of the desired viscosity results. 15 parts of Helio Fast Blue BL paste (20%) (Schultz Farbstofftabellen, volume I, 7th edition, No. 1188) and 15 parts of hexahydro-1.3.5-triacrylyl-s-triazine are added to this paste and the mixture filled up with water to 100° C. The prints obtained from this mixture show excellent clarity and very high fastness properties on rayon staple fabrics and mixed fabrics containing rayon staple.

*Example 3*

5 parts of the sodium salt of sulfonated long chain paraffin hydrocarbons are dissolved in 150 parts of water and 0.6 part of the sodium salt of long chain paraffin sulfinic acids and 2 parts of normal sulfuric acid added thereto. 40 parts of acrylonitrile and 60 parts of butyl acrylate are emulsified in this solution and polymerized in a closed vessel at 15° C. After 24 hours a latex is obtained having a polymer content of 38%, which is divided into three parts (a), (b), and (c).

(a) 2% (calculated on the polymer content) of polyacrylamide is added to this latex as a 10% aqueous solution and intimately mixed therewith.

(b) The same amount of polyacrylic acid is added instead of the polyacrylamide as an aqueous solution of 5%.

(c) The same amount of polyvinylalcohol is added as an aqueous solution of 10%.

The batches (a), (b) and (c) are employed for the production of a printing paste separately as described in Example 1. The prints obtained on rayon staple fabrics are very clear and fast to rubbing and washing.

Instead of the hexahydro-1.3.5-triacrylyl-s-triazine of Example 1, 6 parts of the polyester obtained from 1 part of ethyleneglycol and 2 parts of maleic acid may be employed.

*Example 4*

30 parts of acrylonitrile, 50 parts of vinylidene chloride and 20 parts of butylacrylate are emulsified and polymerized in the mixture of emulsifier and catalyst described in Example 1. 80 parts of the latex obtained are intimately mixed with a mixture of 30 parts of alginate thickening 25/1000 and 24 parts of turpentine, to which had previously been added the acid dimethylamine salt of oleic acid as an emulsifier. 30 parts of Helio Fast Blue BL paste (20%) (Schultz Farbstofftabellen, volume I, 7th edition, No. 1188) and 6 parts of hexahydro-1.3.5-triacrylyl-s-triazine are stirred into this mixture and the whole filled up with water to 100 parts.

Prints obtained with this printing paste on rayon staple or mixed fabrics containing rayon staple show excellent clarity and high fastness to washing and rubbing after drying and steaming. Equal results are obtained if 6 parts of ethylene diacrylamide or 8 parts of 1.2-ethyleneglycoldiacrylate are employed instead of the hexahydro-1.3.5-triacrylyl-s-triazine.

We claim:

1. A process of printing and padding fibrous sheet material, which process comprises applying to said sheet material a printing paste comprising as a binder an emulsion of a copolymer of methylmethacrylate and less than the same amount of butadiene, said printing paste containing in addition not more than 10 per cent of its total weight of hexahydro-1.3.5-triacrylyl-s-triazine.

2. A process of printing and padding fibrous sheet material, which process comprises applying to said sheet material a printing paste comprising as a binder an emulsion of a copolymer of butylacrylate and less than the same amount of acrylonitrile, said printing paste containing in addition not more than 10 per cent of its total weight of hexahydro-1.3.5-triacrylyl-s-triazine.

3. A process of printing and padding fibrous sheet material, which process comprises applying to said sheet material a printing paste comprising as a binder an emulsion of a copolymer of butylacrylate, vinylidene chloride, and less than their total amount of acrylonitrile, said printing paste containing in addition not more than 10 per cent of its total weight of hexahydro-1.3.5-triacrylyl-s-triazine.

4. A process as claimed in claim 3, wherein hexahydro-1.3.5-triacrylyl-s-triazine is replaced by ethylenediacrylamide.

5. A printing paste comprising as a binder an emulsion of a copolymer of methylmethacrylate and less than the same amount of butadiene, said printing paste containing in addition not more than 10 per cent of its total weight of hexahydro-1.3.5-triacrylyl-s-triazine.

6. A printing paste comprising as a binder an emulsion of a copolymer of butylacrylate and less than the same amount of acrylonitrile, said printing paste containing in addition not more than 10 per cent of its total weight of hexahydro-1.3.5-triacrylyl-s-triazine.

7. A printing paste comprising as a binder an emulsion of a copolymer of butylacrylate, vinylidene chloride and less than their total amount of acrylonitrile, said printing paste containing in addition not more than 10 per cent of its total weight of hexahydro-1.3.5-triacrylyl-s-triazine.

8. A process of printing and padding fibrous sheet material, which comprises applying to said sheet material an aqueous printing paste comprising as a binder an emulsion of a copolymer of at least one compound selected from the group consisting of alkyl acrylates and alkyl methacrylates, such alkyl groups having at most four carbon atoms, vinyl chloride and vinylidene chloride, and less than the same amount of at least one compound selected from the group consisting of butadiene, methyl-butadiene, chloro-butadiene, acrylonitrile, ethyleneglycol-diacrylate and trimethylolpropane-di- and -triacrylate, said printing paste containing in addition a compound selected from the group consisting of hexahydro-1,3,5-triacryl-s-triazine, 1,2-ethylene glycol diacrylate and ethylene diacrylamide, and then heating said sheet material at a temperature between about 80 to about 140° to effect cross-linking between said components of the printing paste.

9. An aqueous textile printing paste comprising an emulsion of a copolymer of at least one compound selected from the group consisting of alkyl acrylates and alkyl methacrylates, such alkyl groups having at most four carbon atoms, vinyl chloride and vinylidene chloride, and less than the same amount of at least one compound selected from the group consisting of butadiene, methylbutadiene, chlorobutadiene, acrylonitrile, ethyleneglycoldiacrylate and trimethylolpropane-di- and -triacrylate, said printing paste containing in addition a compound selected from the group consisting of hexahydro-1,3,5-triacrylyl-s-triazine, 1,2-ethylene glycol diacrylate and ethylene diacrylamide.

References Cited in the file of this patent

UNITED STATES PATENTS

| Number | Name | Date |
|---|---|---|
| 2,511,811 | Baer | June 13, 1950 |
| 2,533,635 | Seymour | Dec. 12, 1950 |
| 2,538,779 | Harrison et al. | Jan. 23, 1951 |